United States Patent [19]

Vandamme

[11] Patent Number: 4,508,986

[45] Date of Patent: Apr. 2, 1985

[54] ELECTRIC MOTOR DRIVE FOR A SLOW-RUNNING ANNULAR ROTOR OF A PROCESSING MACHINE

[75] Inventor: Detlef Vandamme, Berlin, Fed. Rep. of Germany

[73] Assignee: Siemens Aktiengesellschaft, Berlin and Munich, Fed. Rep. of Germany

[21] Appl. No.: 560,943

[22] Filed: Dec. 13, 1983

[30] Foreign Application Priority Data

Dec. 20, 1982 [DE] Fed. Rep. of Germany ....... 3247888

[51] Int. Cl.³ .............................................. E02F 3/29
[52] U.S. Cl. ................................. 310/67 R; 37/189; 310/58; 310/64
[58] Field of Search ................... 37/189, 190; 310/57, 310/58, 60 R, 63, 64, 67 R, 52, 66, 67, 43, 90, 112, 114, 56

[56] References Cited

U.S. PATENT DOCUMENTS 2,661,434 12/1953 Kilbourne ............................ 310/64
3,704,759 12/1972 Vitkov et al. ....................... 310/67

FOREIGN PATENT DOCUMENTS 2138597 2/1973 Fed. Rep. of Germany ........ 37/189
2356890 5/1975 Fed. Rep. of Germany ........ 37/189

Primary Examiner—R. Skudy
Assistant Examiner—D. L. Rebsch
Attorney, Agent, or Firm—Kenyon & Kenyon

[57] ABSTRACT

A drive for a slow-running annular rotor of a processing machine includes a rotor supported on a standing tubular body by two bearings, between which the the electric motor driving the annular rotor is fastened to the annular rotor. The stator of the electric motor is disposed on and is likewise supported by the tubular body. The electric motor is of encapsulated design, and a gaseous coolant required for cooling the motor is conducted by forced circulation in a closed cooling loop which includes a heat exchanger disposed in the interior of the tubular body. The heat exchanger is designed as an air/air cooler. Such a drive is particularly suitable for bucket wheels of large-volume baggers employed for example in dusty areas lacking cooling water, for lignite strip mining.

6 Claims, 2 Drawing Figures

ELECTRIC MOTOR DRIVE FOR A SLOW-RUNNING ANNULAR ROTOR OF A PROCESSING MACHINE

BACKGROUND OF THE INVENTION

The present invention relates to an electric motor drive for a slow-running annular motor of a processing machine, particularly the bucketwheel of an excavator (bagger).

Surface or tube-cooled high speed motors are generally coupled to processing machines of the above type via a transmission. Because of the transmission, such drives are relatively expensive.

OBJECTS AND SUMMARY OF THE INVENTION

It is an object of the present invention to provide a drive for an annular rotor of a processing machine as a direct drive.

It is another object of the invention to provide such a drive which is suitable for use in dusty areas.

The above and other objects are achieved by the invention, which provides a drive for a slow-running annular rotor of a processing machine comprising a tubular body, two bearings spaced apart from each other axially along the tubular body for rotatably supporting the rotor on the tubular body, and an electric motor for driving the rotor having a motor rotor disposed between the two bearings fastened to the annular rotor and a stator located inside the rotor and supported outside of the tubular body. The tubular body is conventionally supported. The electric motor is of encapsulated design and a gaseous coolant which cools the electric motor is conducted by forced circulation in a closed cooling loop which includes a heat exchanger in the interior of the tubular body.

The rotor of the electric motor is fastened directly to the rotor of the processing machine. Therefore the drive is a direct drive. As a result little axial space is required. Since the rotor of the processing machine as well as the electric motor are supported by the tubular body via two bearings for the rotor between which the electric motor is located, high stability of the drive is obtained because radial forces are introduced without active bending moments, the bearing spacing being as small as possible. Such radial forces include mechanical transverse forces introduced into the tubular body by the processing machine, as well as the magnetic pull of the electric motor due to the arrangement of bearings on both sides.

Since the electric motor is of encapsulated design and is cooled by forced circulation of a gaseous coolant in a closed cooling loop, the drive can be used in dusty areas, for instance, as a drive for bucket baggers in lignite strip mines. The heat exchanger used for cooling the gaseous coolant of the motor also does not require additional space since it is arranged in the interior of the tubular body.

It is particularly advantageous to use air taken from the environment of the processing machine to cool the gaseous coolant. The air is fed through filters to tubes of the heat exchanger through which it flows. Thereby, the drive can be used in areas where no cooling water is available, and the tubes of the heat exchanger are prevented from being clogged up too quickly by dust deposits, without adversely affecting heat transfer.

It is particularly advantageous to feed the gaseous coolant of the motor from the one side of the motor radially to the heat exchanger through openings located in the tubular body, and to return the gaseous coolant after cooling through openings in the tubular body located at the other side of the motor. Ring canals formed by the encapsulation of the motor are utilized for guidance and uniform distribution of the gaseous coolant, while the axial redirection of the coolant takes place in the interior of the tubular body after radially flowing through the heat exchanger.

It is advantageous to provide the electric motor as a synchronous motor with external poles, since only the field current for the synchronous motor must be transmitted on the rotating part, which can be accomplished in a simple and customary manner via slip rings.

The above and other objects, features, aspects and advantages of the present invention will be more readily perceived from the following description of the preferred embodiments thereof when considered with the accompanying drawings and appended claims.

BRIEF DESCRIPTION OF THE DRAWINGS

The present invention is illustrated by way of example and not limitation in the figures of the accompanying drawings.

DESCRIPTION OF THE PREFERRED EMBODIMENTS

Figure 1:
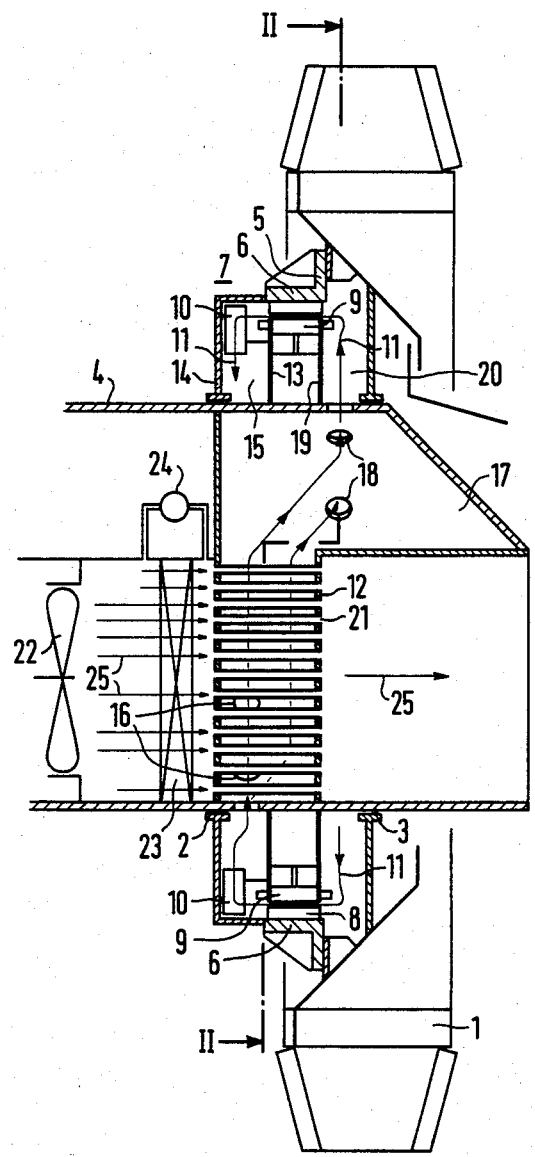
FIG. 1 is a longitudinal section view taken through a drive according to the invention.
Figure 2:
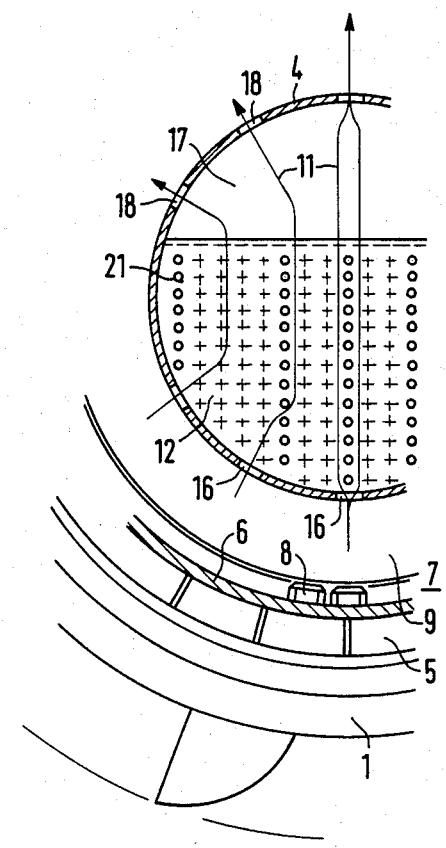
FIG. 2 is a partial cross section taken through lines II—II of FIG. 1.

The slow-rotating rotor 1 of a processing machine such as a bucket wheel of a large volume bagger is supported on a standing or supported tubular body 4 of relatively large circumference by two bearings 2, 3 axially spaced apart. A support ring 5 is flanged to the annular body of the rotor 1 to support the rotor 6 of a synchronous electric motor 7 having external poles 8. The stator 9 of the motor is disposed outside of and supported by the tubular body 4.

The electric motor 7 is of encapsulated design which enables the drive to be used in a dusty environment, and is cooled by a gaseous coolant such as air, which is force circulated by one or more blowers 10 in a closed loop. The circulation of the coolant is indicated by arrows 11. Removal of the dissipation heat of the electric motor which is absorbed by the coolant is accomplished by a heat exchanger 12 in the interior of the tubular body 4.

Circulation of the gaseous coolant for the electric motor 7 is as follows. The coolant enters the electric motor in the axial direction (relative to the axis of the tubular member) flowing past one side 13 of the motor into an annular space 15 located between the wall 14 of the encapsulation and the motor side 13, in which the coolant is distributed uniformly. Openings 16 are provided in the annular space 15 in the vicinity of the heat exchanger 12, which takes up only part of the tubular body 4. The gaseous coolant enters the interior of the heat exchanger 12 through the openings 16 and flows radially (relative to the axis of the tubular member) through the heat exchanger. After leaving the heat exchanger 12, the coolant is redirected in the axial direction to the rest of the interior 17 of the tubular body 4, which is empty, and conducted to openings 18 in the tubular body 4 which are located on the circumference corresponding to the other side 19 of the electric motor 7. Through these openings 18, the coolant passes into the annular space 20 located in front of the motor e 19, is distributed uniformly along the entire circumference. From there, the coolant reenters the electric motor 7 in the axial direction.

The heat exchanger 12 is designed as an air/air cooler and includes tubes 21 which are arranged parallel to the axis of the tubular body 4. Air from the exterior environment of the processing machine flows through the tubes 21 as drawn-in by the blower 22. Before entering the tubes 21 of the heat exchanger 12, the air is conducted through a filter 23 which retains impurities contained in the air at the site of the processing machine, so that the tubes 21 of the heat exchanger 12 will not clog up too easily and hinder heat transfer.

Apparatus 24 connected to both sides of the filter 23 determines the degree of clogging of the filter 23 so that the filter can be changed when necessary. The arrows 25 indicate the flow of air taken from the environment through the heat exchanger 12 which is then returned to the environment of the processing machine.

Certain changes and modifications of the embodiments of the invention disclosed herein will be readily apparent to those skilled in the art. It is the applicant's intention to cover by his claims all those changes and modifications which could be made to the embodiments of the invention herein chosen for the purpose of disclosure without departing from the spirit and scope of the invention.

What is claimed is:

1. A drive for a slow-running annular rotor of a machine, the drive comprising a tubular body, two bearings spaced apart from each other axially along the tubular body for rotatably supporting the rotor on the tubular body, an electric motor for driving the rotor having a motor rotor disposed between the two bearings fastened to the annular rotor and a stator supported between the two bearings on the outside of the tubular body, the electric motor being of encapsulated design, a closed cooling loop including the electric motor and a heat exchanger through which a gaseous coolant is circulated to cool the electric motor, and means for conducting the coolant with forced circulation in the closed cooling loop, the heat exchanger being disposed in the interior of the tubular body.

2. The drive according to claim 1 wherein the heat exchanger comprises a plurality of tubes disposed with their axes parallel to the axis of the tubular body between which the gaseous coolant flows, and openings in the tubular body from a side of the motor through which the coolant is radially introduced to the tubes.

3. The drive according to claim 2 wherein the tubes of the heat exchanger are disposed in only a part of the tubular body and said openings for the coolant are located in this part of the tubular body on a circumference corresponding to said side of the motor, and further openings in the remaining part of the tubular body lying on a circumference corresponding to an opposite side of the motor.

4. The drive according to claim 1 and comprising means for feeding air taken from the environment of the processing machine to the heat exchanger to cool the coolant, said feeding means including filters through which the air is fed to the tubes of the heat exchanger.

5. The drive according to claim 1 wherein the motor is a synchronous external pole motor.

6. The drive according to claim 1 where in the slow-running rotor of the machine is a bucketwheel of an excavator.

* * * * *